US012187351B2

(12) United States Patent
Adams et al.

(10) Patent No.: US 12,187,351 B2
(45) Date of Patent: Jan. 7, 2025

(54) POWERED DUAL HINGE TAILGATE

(71) Applicant: STRATTEC POWER ACCESS LLC, Auburn Hills, MI (US)

(72) Inventors: Mark E. Adams, Troy, MI (US); Theodore J. Lindsay, Shelby Township, MI (US); Gregory J. Flood, Davisburg, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 286 days.

(21) Appl. No.: 17/743,669

(22) Filed: May 13, 2022

(65) Prior Publication Data

US 2022/0363321 A1 Nov. 17, 2022

Related U.S. Application Data

(60) Provisional application No. 63/188,841, filed on May 14, 2021.

(51) Int. Cl.
*B62D 33/027* (2006.01)
*E05F 15/63* (2015.01)

(52) U.S. Cl.
CPC .......... *B62D 33/0273* (2013.01); *E05F 15/63* (2015.01); *E05Y 2900/544* (2013.01)

(58) Field of Classification Search
CPC ..... B62D 33/0273; B62D 33/03; E05F 15/63; E05Y 2900/544; B60P 1/435
See application file for complete search history.

(56) References Cited

U.S. PATENT DOCUMENTS

| | | | | |
|---|---|---|---|---|
| 6,217,097 | B1 * | 4/2001 | Rogers, Jr. | E05F 15/63 49/342 |
| 11,536,074 | B2 * | 12/2022 | Schalyo | E05F 15/614 |
| 2020/0340282 | A1 | 10/2020 | Sproule et al. | |
| 2021/0155297 | A1 * | 5/2021 | Lakerdas | B62D 33/037 |
| 2021/0403097 | A1 * | 12/2021 | Gase | B62D 33/0273 |
| 2022/0097608 | A1 * | 3/2022 | Patterson | B62D 33/03 |
| 2022/0314861 | A1 * | 10/2022 | Tyler | B62D 33/03 |

OTHER PUBLICATIONS

Images: 2019 GMC Sierra with Multipro Tailgate, Publicly available prior to May 14, 2021, Images are available at website: https://media.gmc.com/media/us/en/gmc/photos.detail.html/content/Pages/galleries/us/en/vehicles/gmc/2019/19-multipro-tailgate.html, (3 Pages).

* cited by examiner

*Primary Examiner* — Daniel J Colilla
(74) *Attorney, Agent, or Firm* — Michael Best & Friedrich LLP

(57) ABSTRACT

A power operated tailgate for a vehicle includes a major gate having a hinge about which the major gate is configured to be coupled to the vehicle for movement between open and closed positions, a minor gate configured to be coupled to the major gate for movement between open and closed positions with respect to the major gate, and a minor gate drive unit configured to drive movement of the minor gate with respect to the major gate. The minor gate is disposed at least partially within an outer profile of the major gate and supported by the major gate for movement therewith.

10 Claims, 11 Drawing Sheets

94 38 94 74L 74R 34 98 54 50 98 66

POWERED DUAL HINGE TAILGATE

CROSS-REFERENCE TO RELATED APPLICATIONS

This application claims priority to U.S. Provisional Patent Application No. 63/188,841, filed on May 14, 2021, the entire content of which is incorporated herein by reference.

BACKGROUND OF THE INVENTION

The present invention relates to vehicle tailgates and more particularly to power operated vehicle tailgates.

SUMMARY OF THE INVENTION

The present invention provides, in one aspect, a power operated tailgate for a vehicle. The power operated tailgate includes a major gate having a hinge about which the major gate is configured to be coupled to the vehicle for movement between open and closed positions, a minor gate configured to be coupled to the major gate for movement between open and closed positions with respect to the major gate, and a minor gate drive unit configured to drive movement of the minor gate with respect to the major gate. The minor gate is disposed at least partially within an outer profile of the major gate and supported by the major gate for movement therewith.

The present invention provides, in another aspect, a power operated tailgate for a vehicle. The power operated tailgate includes a major gate having a hinge about which the major gate is configured to be rotatably coupled to the vehicle, the major gate at least partially defining an outer profile of the power operated tailgate, a minor gate disposed within the outer profile of the power operated tailgate, the minor gate at least partially defining the outer profile and coupled to the major gate, the minor gate rotatable relative to the major gate about a first axis, a minor hinge coupled to the minor gate and to the major gate, the minor hinge configured to facilitate rotation of the minor gate about the first axis with respect to the major gate, a minor gate drive unit offset from the first axis and configured to rotationally drive the minor gate about the first axis relative to the major gate, and a linkage assembly coupled to an output member of the minor gate drive unit and to the minor gate, the linkage assembly configured to transmit a drive force for moving the minor gate.

The present invention provides, in yet another embodiment, a power operated tailgate for a vehicle. The power operated tailgate includes a major gate having a hinge defining a major gate rotational axis about which the major gate is configured to be coupled to the vehicle for movement between open and closed positions, the major gate having a rectangular outer profile with a cutout therein, the major gate at least partially defining an outer profile of the power operated tailgate, a minor gate rotatably coupled to the major gate about a minor gate rotational axis oriented parallel to the major gate rotational axis, the minor gate disposed at least partially within the cutout of the outer profile of the major gate, the minor gate at least partially defining the outer profile of the power operated tailgate, and a minor gate drive unit configured to rotationally drive the minor gate about the minor gate rotational axis relative to the major gate, the minor gate drive unit disposed within the outer profile of the power operated tailgate.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
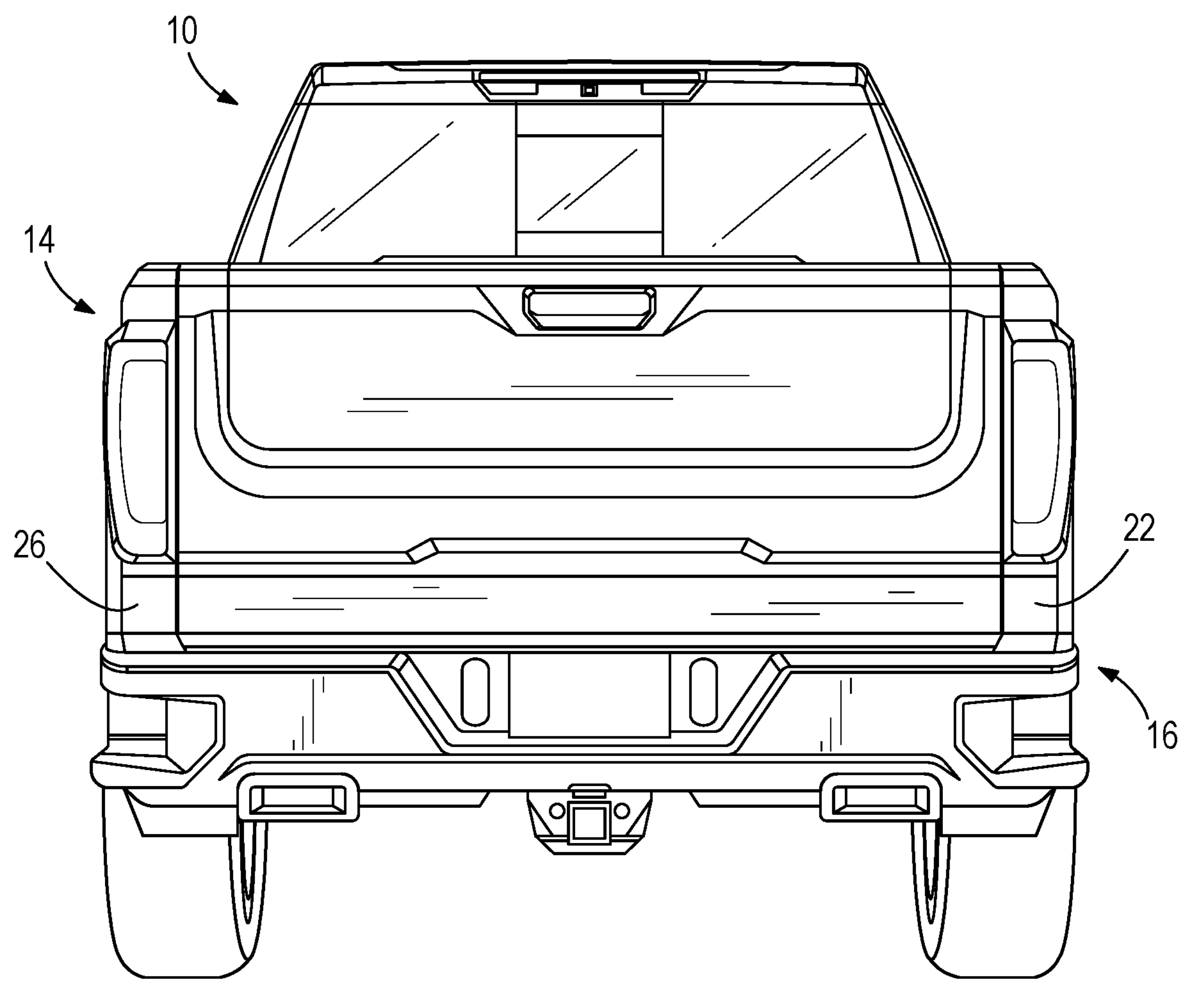
FIG. 1 is a perspective view of a rear portion of a pickup truck including a tailgate according to one embodiment of the present disclosure.
Figure 2:
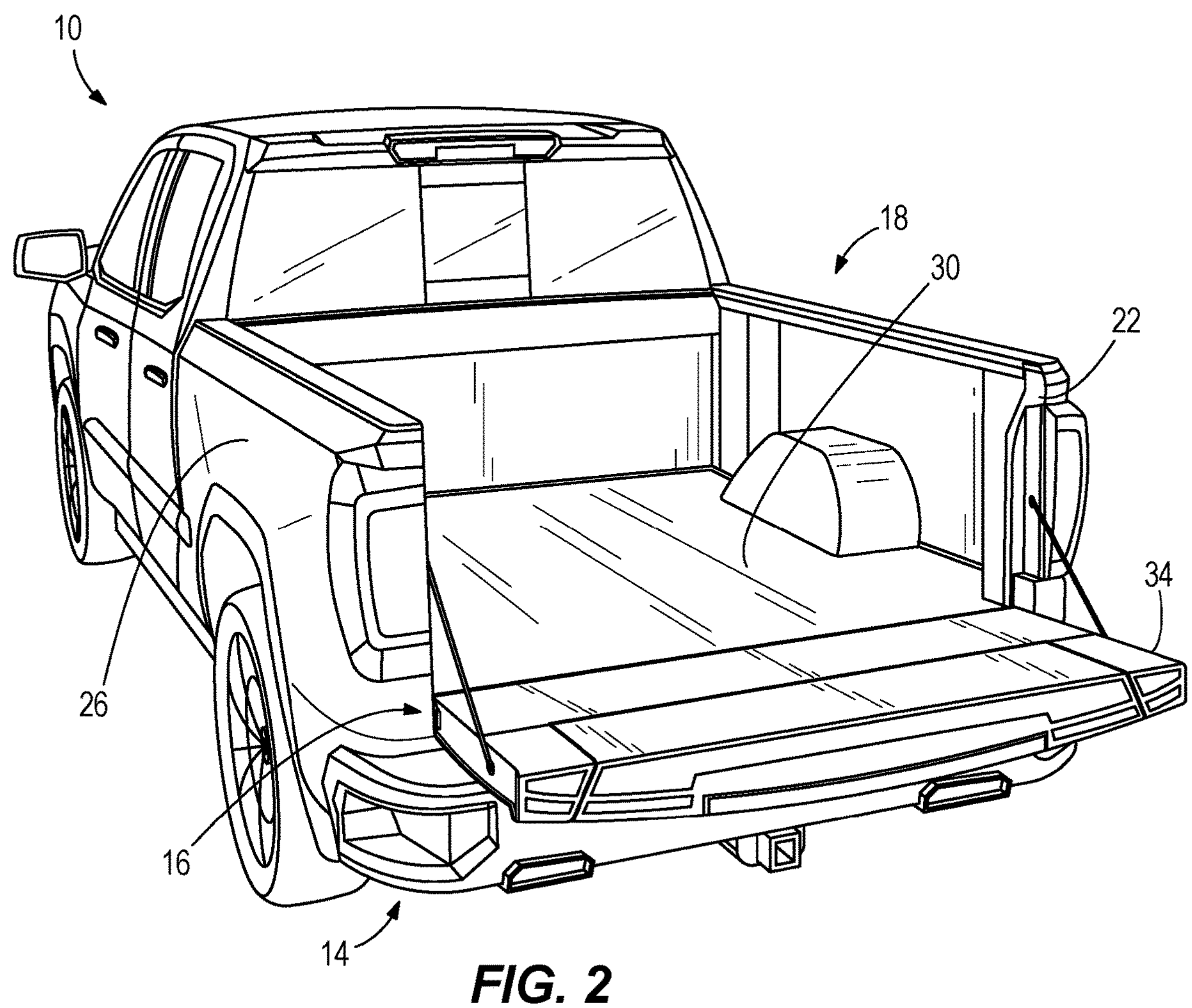
FIG. 2 is a perspective view of the tailgate of FIG. 1 in a first open position.

FIG. 1 illustrates a vehicle 10 having a tailgate 14 according to one embodiment of the present disclosure. The vehicle 10 is depicted as a pickup truck having an open bed 18 (FIG. 2) formed of opposing side walls 22, 26 and the tailgate 14. The tailgate 14 is configured to allow easy access to the space within the walls 22, 26 of the bed 18 (FIG. 2). While details of the present disclosure are given in the context of a light duty pickup truck, it will be understood that features described herein may also apply to the tailgates of other vehicles.

The tailgate 14, as shown in in FIGS. 1-4, is disposed at the rearmost end of the bed 18 laterally between the opposing side walls 22, 26. A lower portion 16 of the tailgate 14 is hingedly coupled to the vehicle 10 so that the tailgate 14 is rotatable relative to the vehicle 10. In a closed position (FIG. 1), a vertical height of the tailgate 14, as measured from a lowermost point on the tailgate 14 to an uppermost point on the tailgate 14, is substantially the same as a vertical height of the opposing side walls 22, 26, as measured from the base surface 30 of the bed 18 to the uppermost point on the sidewalls 22, 26. The tailgate 14 is substantially vertically oriented while in the closed position of FIG. 1. In other words, the tailgate 14 is oriented perpendicularly to the base surface 30 while in the closed position. The tailgate 14 of the illustrated embodiment, having the above described dimensions, is rectangular in shape.

Figure 3:
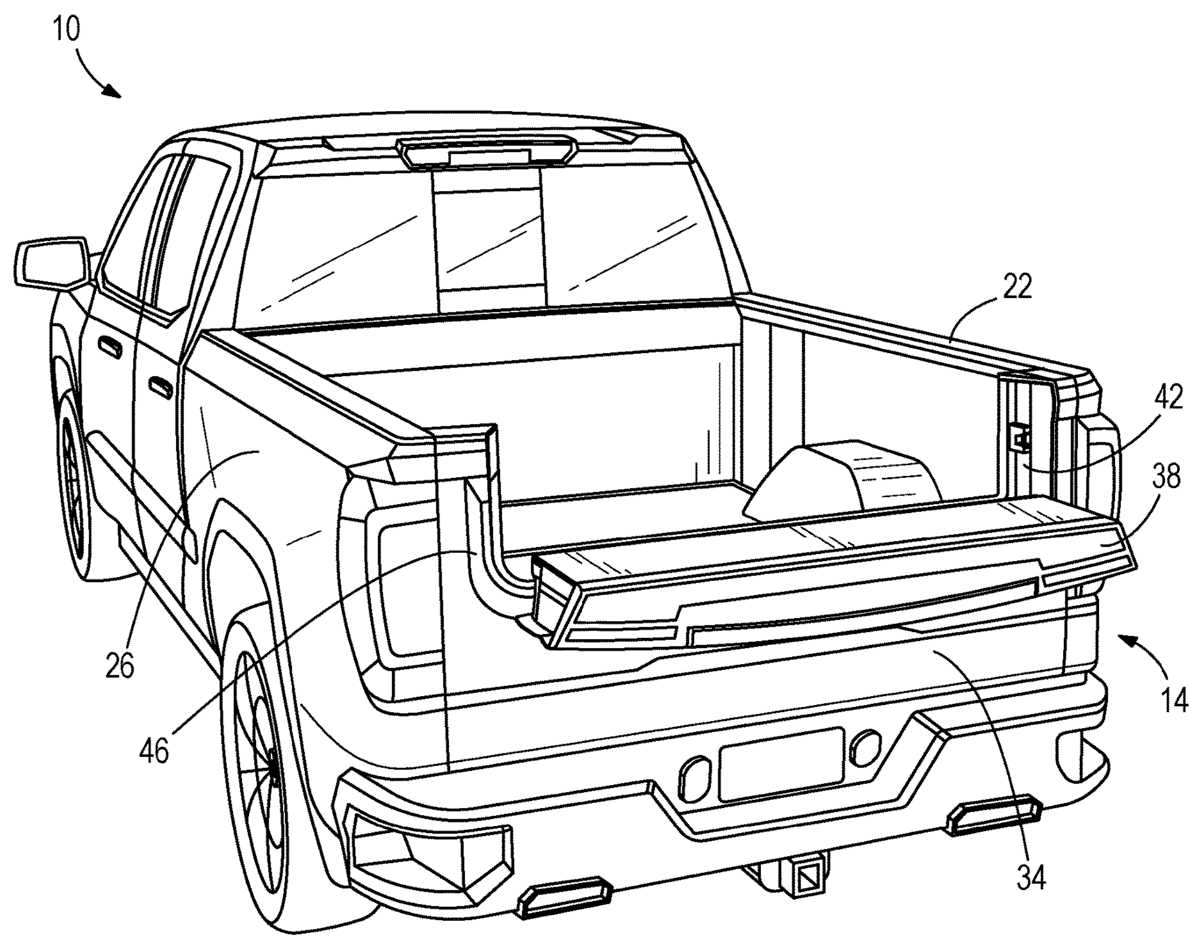
FIG. 3 is a perspective view of the tailgate of FIG. 1 in a second open position.
Figure 4:
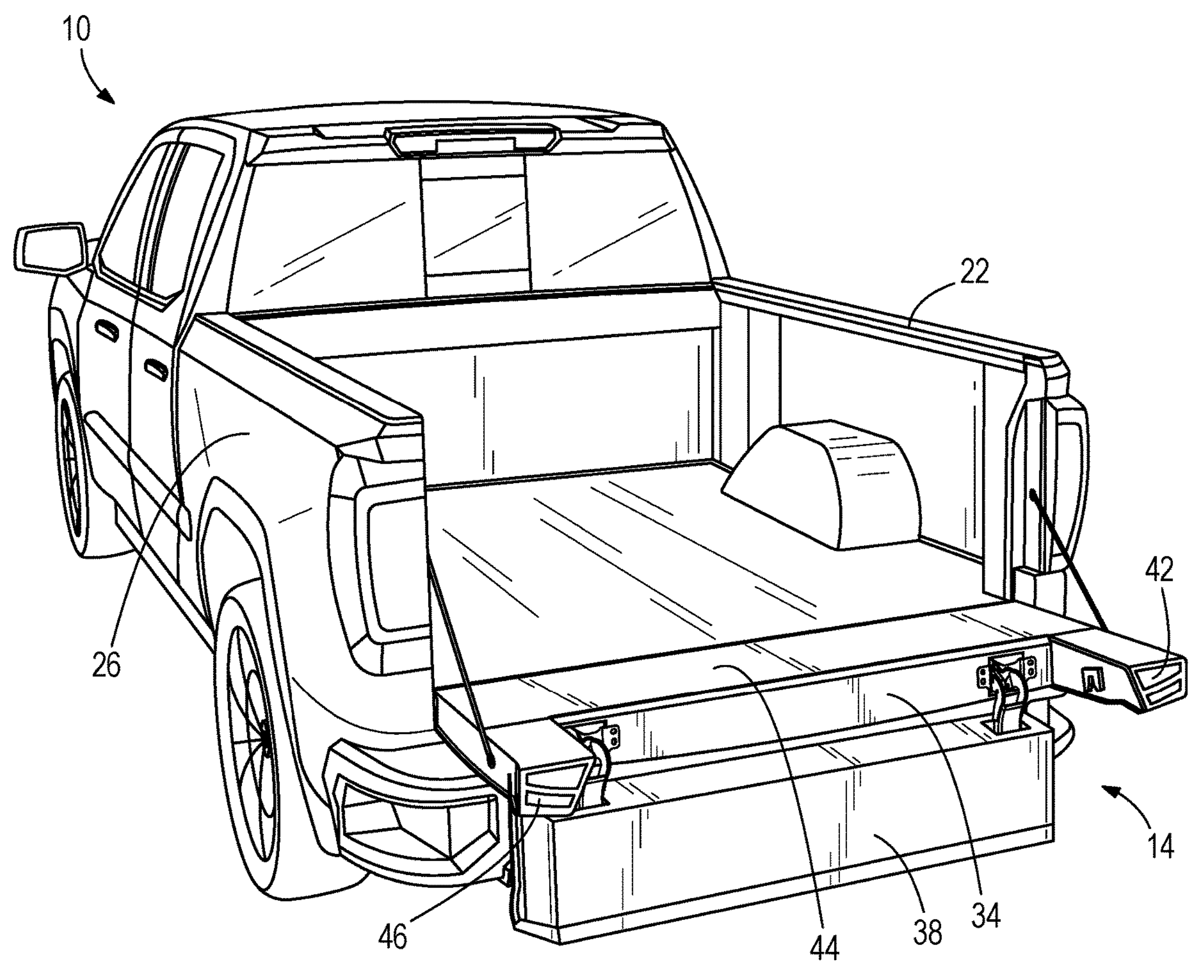
FIG. 4 is a perspective view of the tailgate of FIG. 1 in a third open position.

FIGS. 2-4 illustrate the tailgate 14 in various open positions. To achieve the various open positions, the tailgate 14 includes multiple portions configured to be separately or jointly opened. Specifically, the tailgate 14 includes a major gate 34 and a minor gate 38. The major gate 34 forms a primary portion of the tailgate 14 and is supported by the vehicle 10, while the minor gate 38 forms a secondary portion of the tailgate 14 and is supported by the major gate 34. The major gate 34 spans the lateral distance between the opposing side walls 22, 26 of the vehicle 10. The major gate 34 includes right and left lateral portions 42, 46 which extend the vertical height of the tailgate 14. A central portion 44, between the lateral portions 42, 46, of the illustrated major gate 34 has a reduced overall height and represents about ⅔ of the vertical height of the tailgate 14. In other words, the major gate 34 is "U" shaped. Located within an upper portion of the tailgate 14 is the minor gate 38. The minor gate 38 is shaped to fit between the outer lateral portions 42, 46 of the major gate 34 such that the combination of the major gate 34 and minor gate 38 forms the rectangular shape of the tailgate 14. In other words, an overall rear view profile (e.g., rectangular profile) of the major gate 34 can be generally rectangular, with a cutout on a top side thereof. The cutout in the profile, which may occupy a majority but less than an entirety of a width of the rectangular profile, is filled by the minor gate 38. In other embodiments, the relative sizes of the major and minor gates 34, 38 may vary. For example, the minor gate 38 may span about ⅔ of the vertical distance of the tailgate 14 instead of the major gate 34. The major and minor gates 34, 38 may also equally divide the vertical length of the tailgate 14. The respective upper edges of the minor gate 38 and the lateral outboard portions 42, 46 of the major gate can be aligned with one another, when the minor gate 38 is closed, so that they cooperate to form a consistent upper edge of the tailgate 14.

The major gate 34 is rotationally supported by the opposing side walls 22, 26, via a major hinge assembly 62, while the minor gate 38 is rotationally supported by the major gate 34 via a minor hinge assembly 74. The illustrated major hinge assembly 62 includes a left major hinge 62L and a right major hinge 62R, and the illustrated minor hinge assembly 74 includes a left minor hinge 74L and a right minor hinge 74R. The minor gate 38 does not directly engage the opposing side walls 22, 26 or any other portion of the vehicle 10. Only the major gate 34 directly engages the vehicle 10. Specifically, the major gate 34 is configured to have 90 degrees of rotational freedom with respect to the base surface 30, such that in a first open position, as shown in FIG. 2, the major gate 34 (in particular, an interior wall thereof) is parallel to and coplanar with the base surface 30 of the bed 18. The minor gate 38 is also configured to have 90 degrees of rotational freedom. However, rotation of the minor gate 38 is measured with respect to the major gate 34, rather than the vehicle 10. In an open position of the minor gate 38 only, as shown in FIG. 3, the minor gate 38 (in particular, an interior wall thereof) is parallel to the base surface 30 of the bed 18 and perpendicular to the major gate 34. From this position, opening the major gate 34 without closing the minor gate 38 results in the minor gate 38 being perpendicular to the base surface 30 of the bed, as shown in FIG. 4. The major and minor gates 34, 38 are configured to independently rotate to result in the various open positions of FIGS. 2-4. In the position of FIG. 2, the major gate 34 is open and the minor gate 38 is closed, resulting in an open configuration similar to a standard tailgate. In the position of FIG. 3, the major gate 34 is closed and the minor gate 38 is opened. Finally, in the position of FIG. 4, both the major gate 34 and the minor gate 38 are open.

Figure 5:
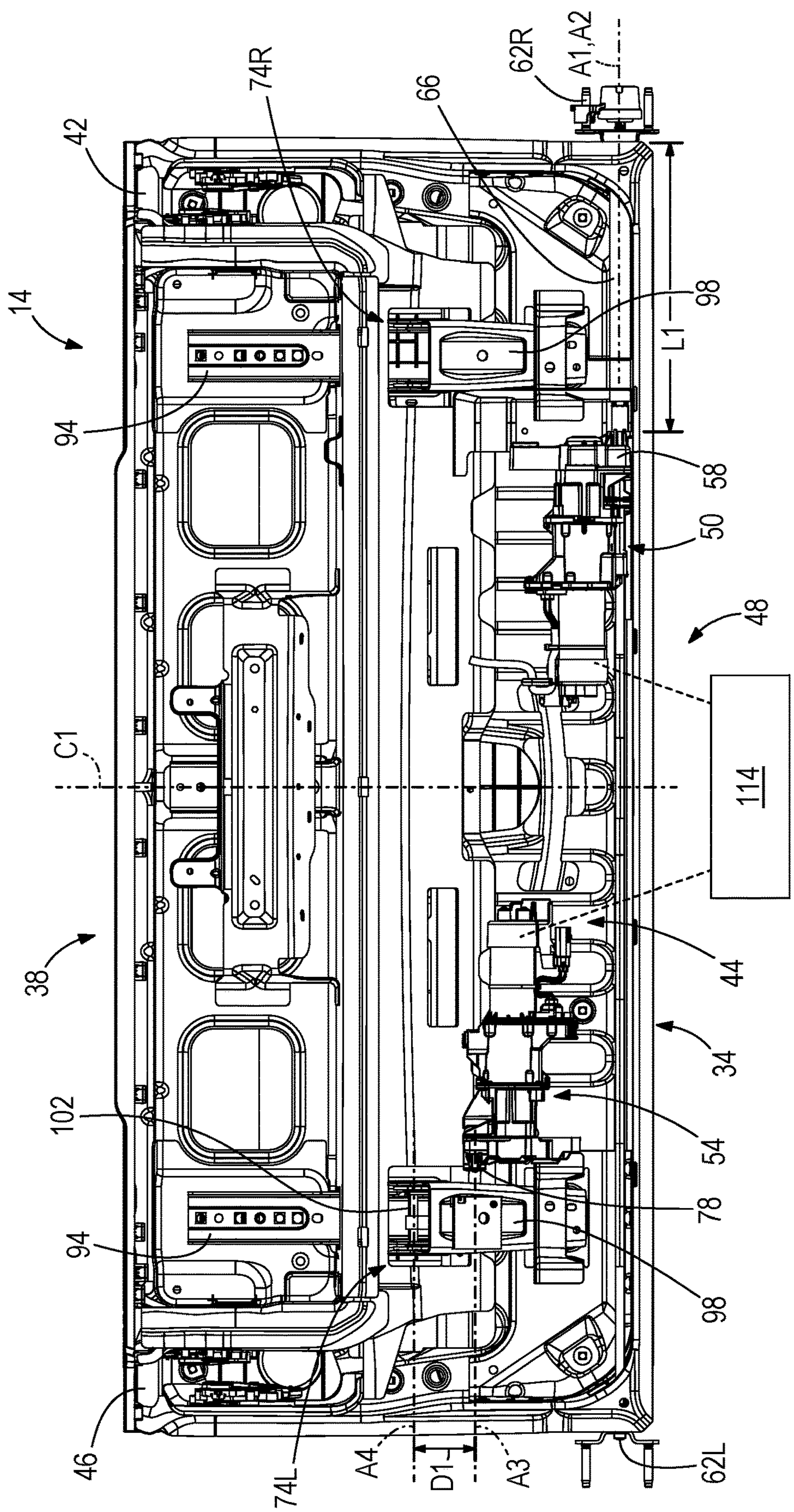
FIG. 5 is a cross-sectional view of the tailgate of FIG. 1

The tailgate 14 includes a drive system 48 having drive units configured to separately open and close the major and minor gates 34, 38 under power. FIG. 5 illustrates the drive system 48 of the tailgate 14. Specifically, the drive system 48 includes a major gate drive unit 50 configured to rotate the major gate 34 and a minor gate drive unit 54 configured to rotate the minor gate 38. Each drive unit 50, 54 may include an electric motor, one or more gear sets, in particular planetary gear sets, one or more clutches, and one or more brakes. One or both of the drive units 50, 54 can include an electromagnetic clutch that can be selectively opened and closed on command, although other clutches including passive slip clutches can also be used. Each drive unit 50, 54 can be configured to provide one or both of powered opening and powered closing, including cinching closed for latching. One or both of the drive units 50, 54 may include any or all of the features disclosed in U.S. Patent Application Publication No. 2020/0340282, the entirety of which is incorporated by reference herein. The major gate drive unit 50 is disposed within the major gate 34 and oriented such that an output end 58 faces laterally outward from a vertical centerline Cl of the tailgate 14. Furthermore, the major gate drive unit 50 is located between the vertical centerline Cl and the right lateral portion 42 of the major gate 34 that the output end 58 faces. The major gate drive unit 50 is vertically located such that a rotational axis A1 of the drive unit 50 is coaxial with a rotational axis A2 of a major hinge assembly 62, about which the major gate 34 rotates when opening and closing. The major hinge assembly 62 is located proximate the bottom most edge of the tailgate 14. A major drive output member 66, illustrated as a shaft, couples the major gate drive unit 50 to the major hinge assembly 62 for co-rotation. The major drive shaft 66 is sufficiently long so that the major gate drive unit 50 can be laterally located within the central portion 44 of the major gate 34. In some embodiments, the major drive shaft 66 has a length L1 of at least 20 mm, or at least 70 mm. Further, in some embodiments, the major drive shaft can be up to 650 mm in length. The central portion 44, as previously defined, is the area between the right and left lateral portions 42, 46 of the major gate 34. Not counting the major drive shaft 66, the entire major gate drive unit 50 can be positioned between the vertical centerline Cl and the right minor hinge 74R.

With continued reference to FIG. 5, the minor gate drive unit 54 is disposed within the major gate 34 and vertically located proximate a top edge of the central portion 44 of the major gate 34. In other words, the minor gate drive unit 54 is disposed within the major gate 34 below the cutout. Similar to the major gate drive unit 50, the minor gate drive unit 54 is laterally located within the central portion 44 of the major gate 34 and between the left minor hinge 74L and the right minor hinge 74R. More specifically, the minor gate drive unit 54 is located on the opposite side of the vertical centerline Cl than the major gate drive unit 50 and between the vertical centerline Cl and the left lateral portion 46 of the major gate 34. A linkage assembly 70, shown in FIG. 6, operably couples the minor gate drive unit 54 to the left minor hinge assembly 74L, which facilitates opening and closing of the minor gate 38. Each of the left and right minor hinges 74L, 74R includes a first strap 94, a second strap 98, and a rotating assembly 102. The first strap 94 is located within the minor gate 38, and the second strap 98 is located within the major gate 34 and vertically aligned with the first strap 94. The rotating assembly 102 connects the first and second straps 94, 98 for rotation about a common axis A4, hereafter referred to the rotational axis of the minor hinge 74. The linkage assembly 70 allows a rotational axis A3 of the minor gate drive unit 54 to be vertically offset from the rotational axis A4 of the minor hinge assembly 74. Having a vertical offset between the axis A3 and axis A4 provides flexibility for the mounting location of the minor gate drive unit 54. Specifically, the rotational axis A3 is offset a distance D1 from the rotational axis A4 by at least 50 mm. For example, the offset distance D1 may be at least 80 mm. In some embodiments, the offset distance D1 is up to 100 mm, or up to 150 mm. Again, similar to the major gate drive unit 50, the minor gate drive unit 54 is oriented such that an output end 78 faces laterally outward from the vertical centerline Cl. In other words, the output end 78 faces the left lateral portion 46. The output ends 58, 78 face opposite lateral portions 42, 46 such that the major gate drive unit's output end 58 faces the right lateral portion 42 and the minor gate drive unit's output end 78 faces the left lateral portion 46. In other embodiments, the output ends 58, 78 may face the same lateral portion 42, 46 of the major gate 34, depending on the desired tailgate configuration and drive unit mounting locations. Not counting the linkage assembly 70, the entire minor gate drive unit 54 can be positioned between the vertical centerline Cl and the adjacent minor hinge assembly 74.

Figure 6:
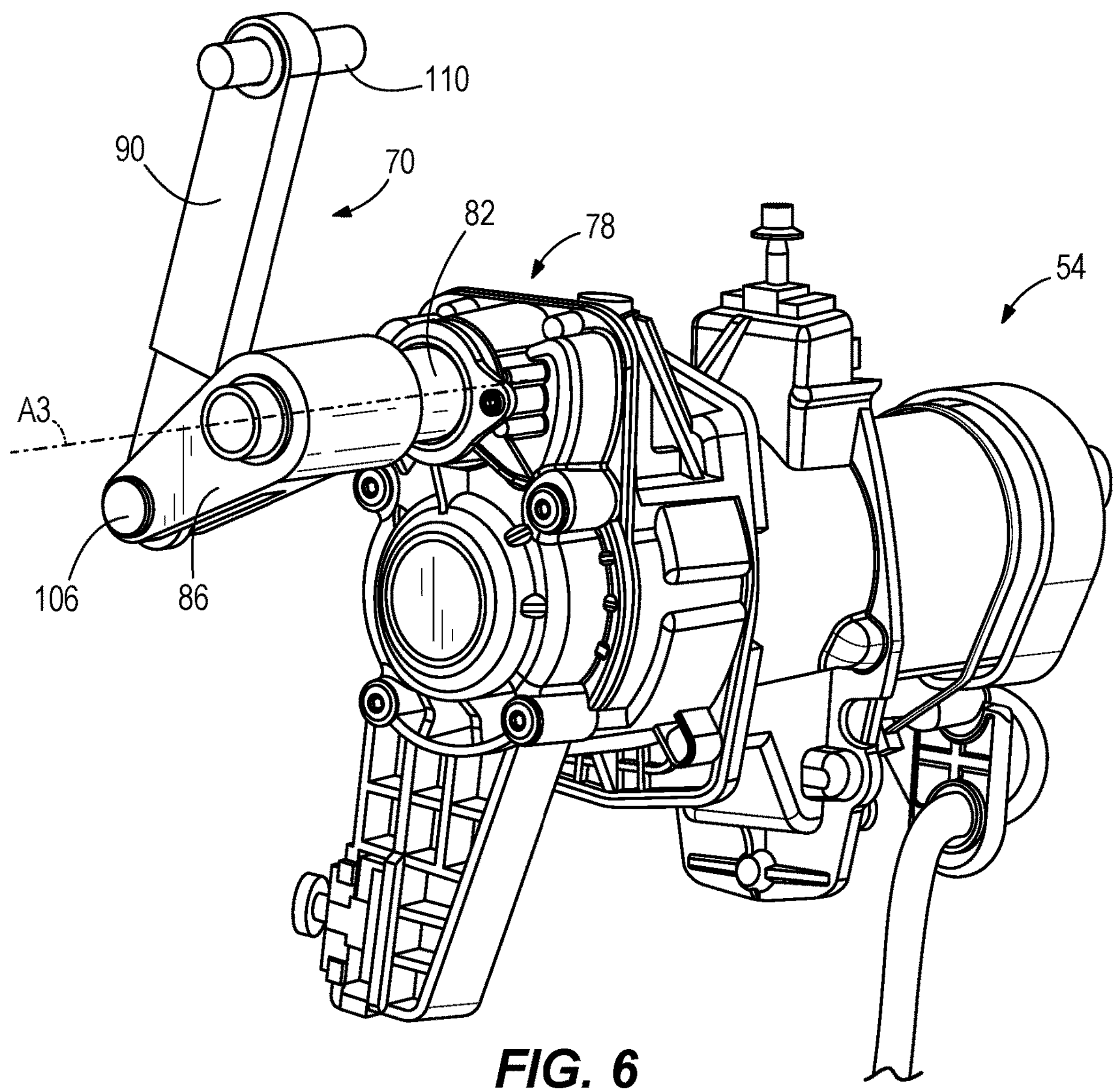
FIG. 6 is a perspective view of the minor gate drive unit with the remainder of the tailgate hidden for clarity.
Figure 7:
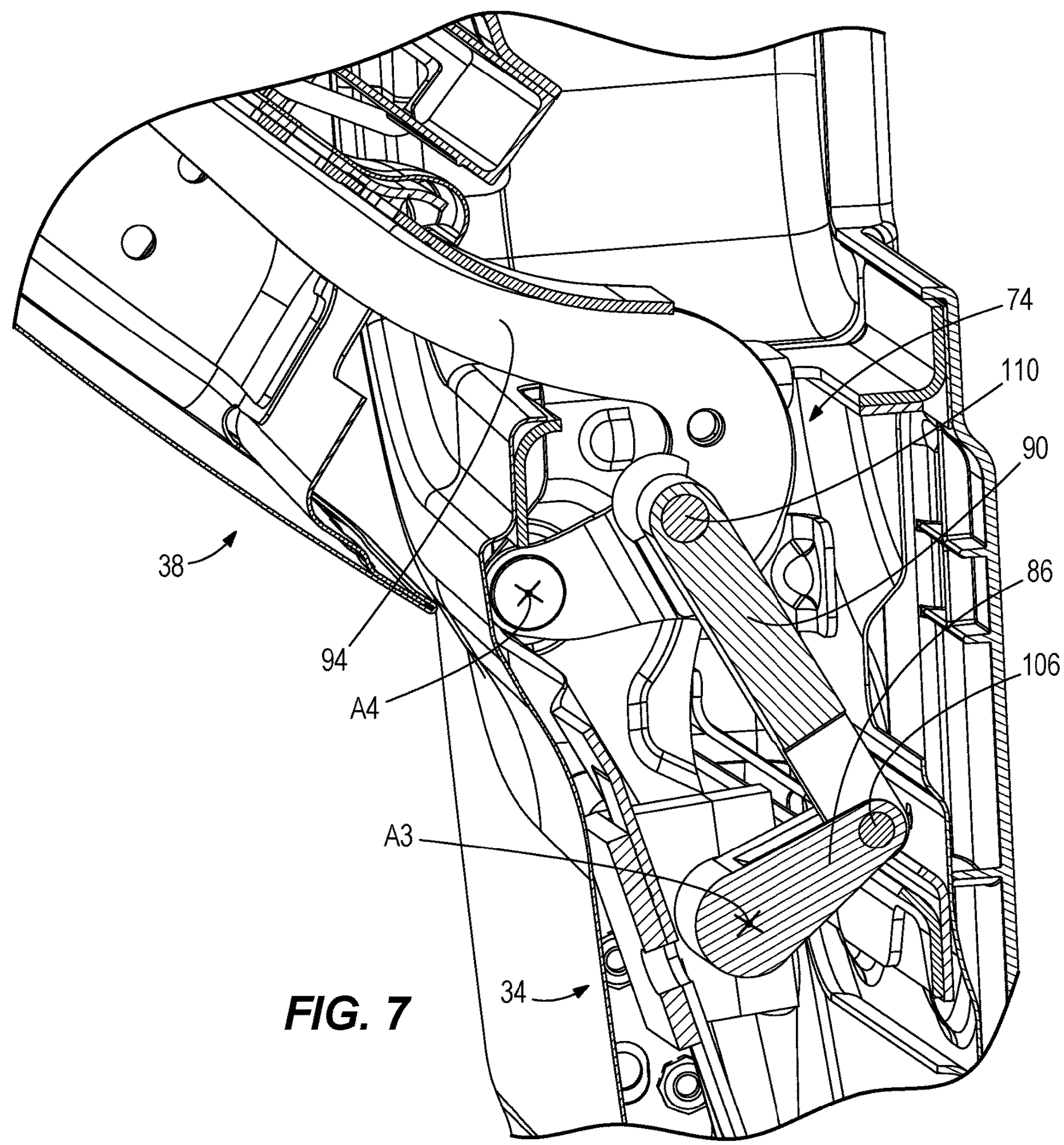
FIG. 7 is a detail view of the minor gate drive linkage, according to one embodiment of the present disclosure, with the minor gate drive unit hidden for clarity.
Figure 8:
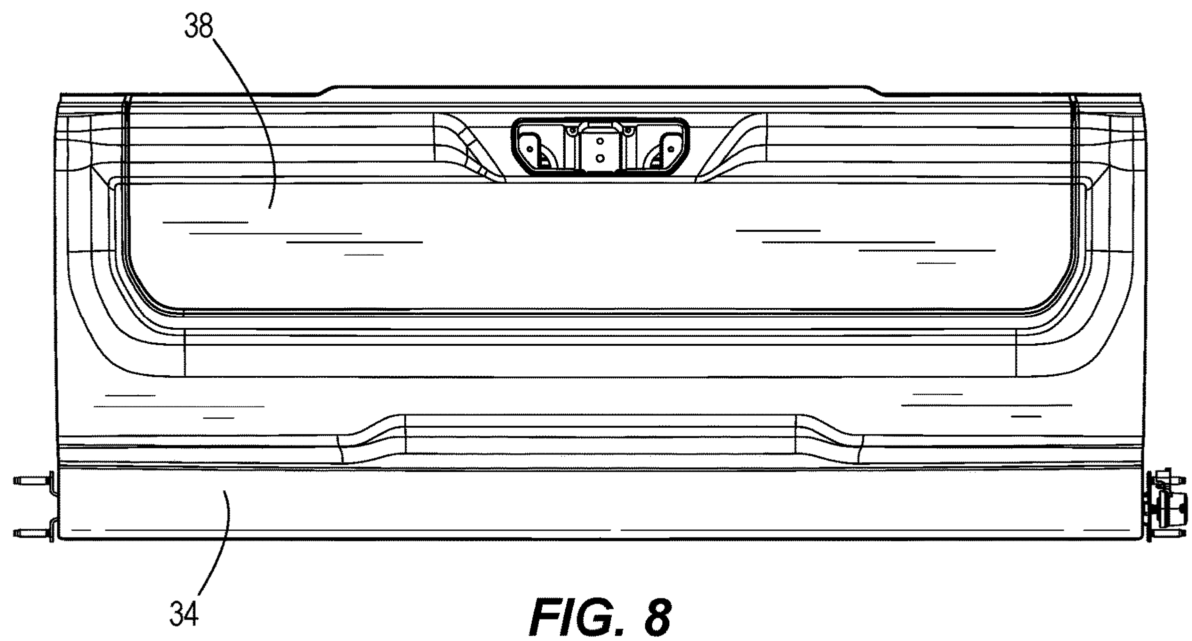
FIG. 8 is a rear view of the tailgate of FIG. 1.
Figure 9:
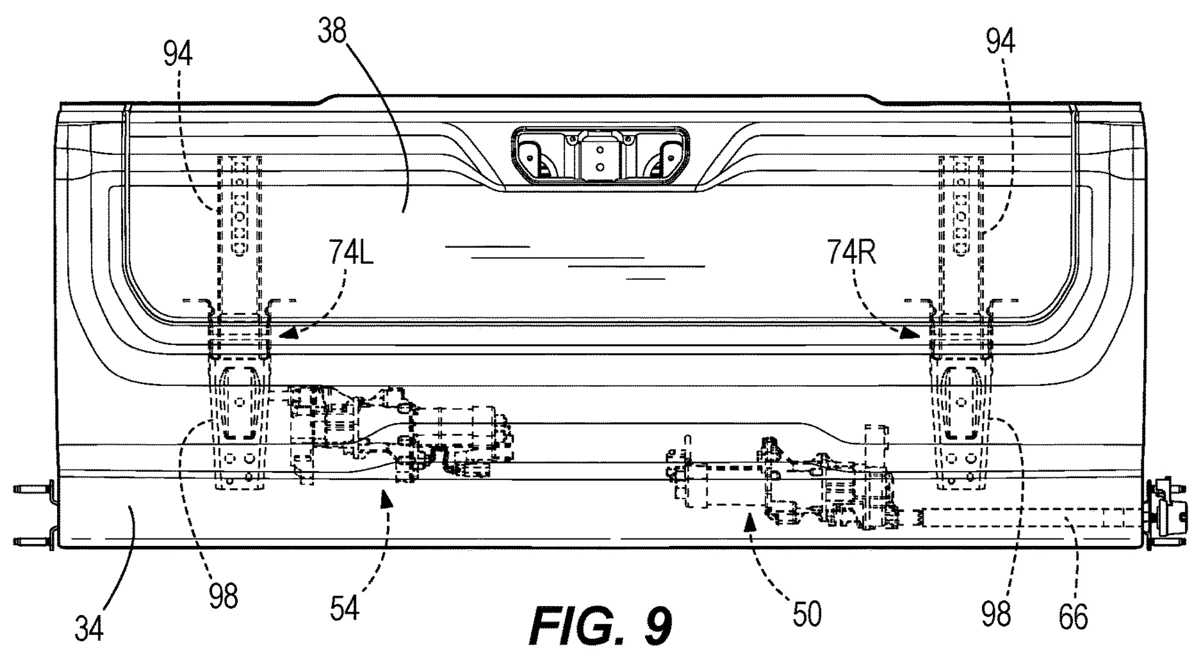
FIG. 9 is a perspective view of the tailgate of FIG. 1.
Figure 10:
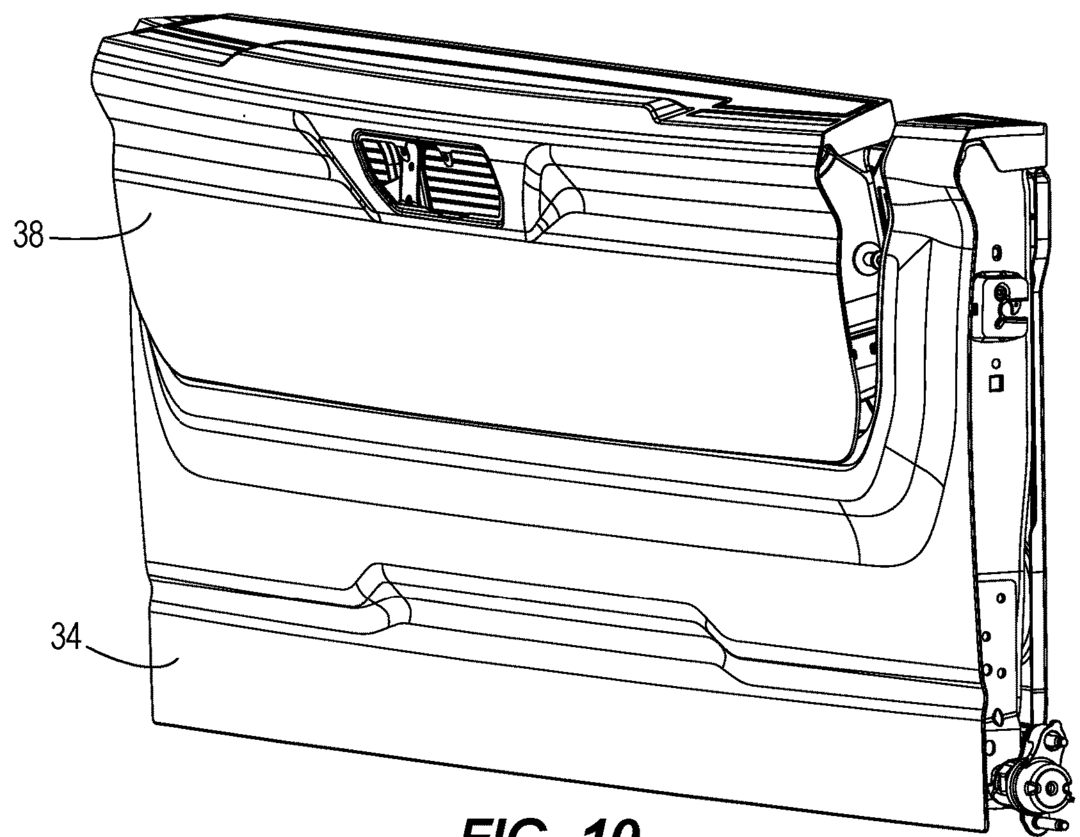
FIG. 10 is a perspective view of the tailgate of FIG. 1 in a partially open position.
Figure 11:
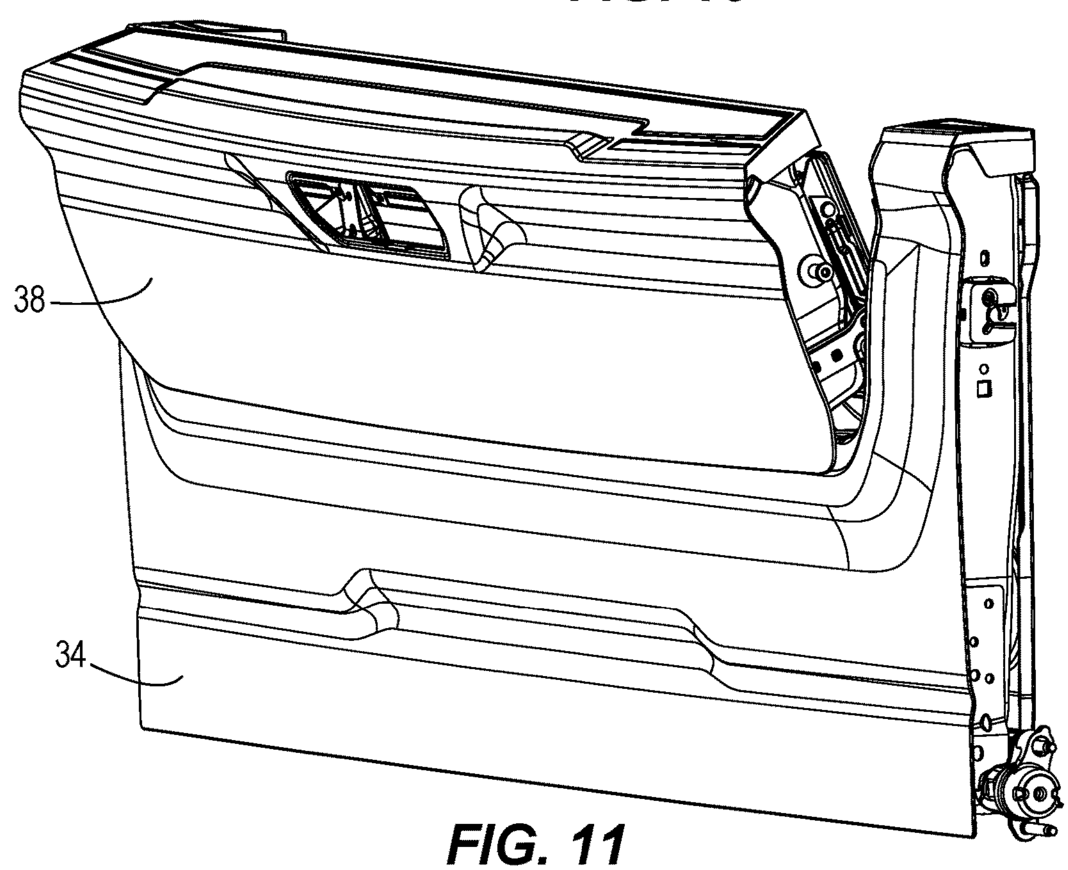
FIG. 11 is a perspective view of the tailgate of FIG. 1 in a partially open position.
Figure 12:
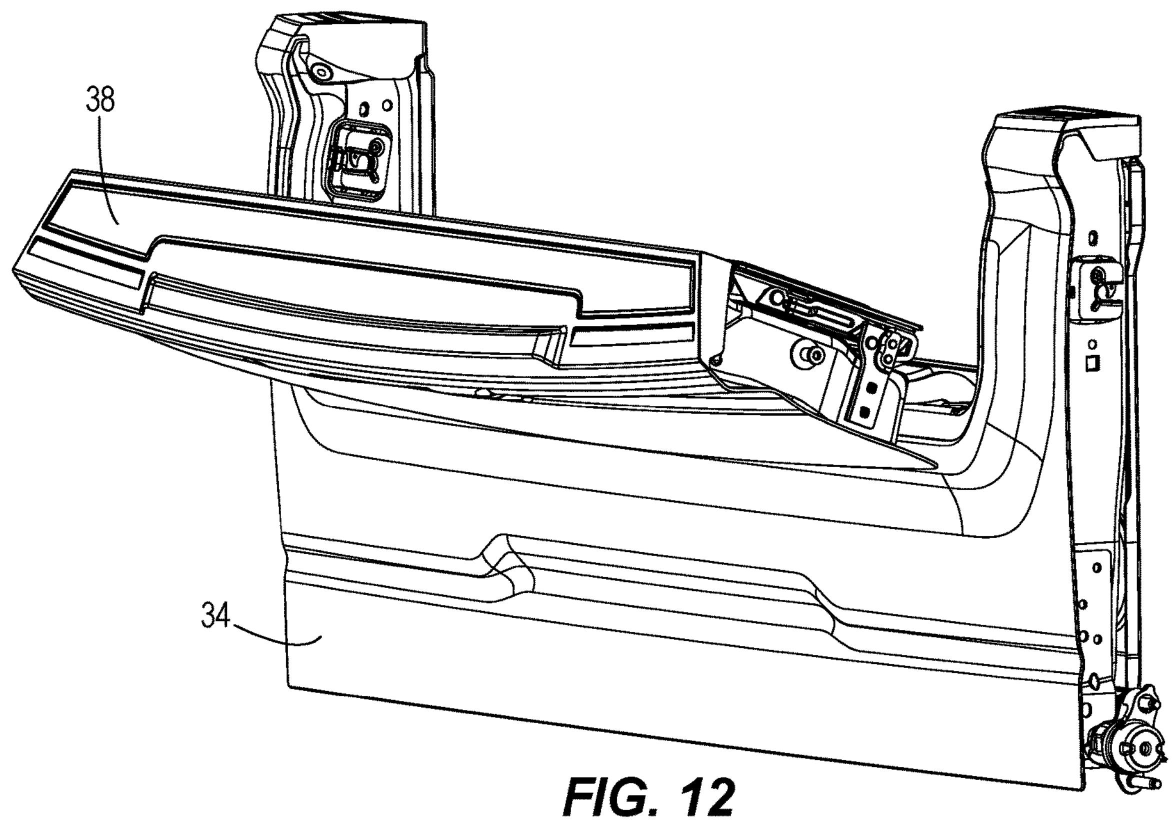
FIG. 12 is a perspective view of the tailgate of FIG. 1 in a partially open position.
Figure 13:
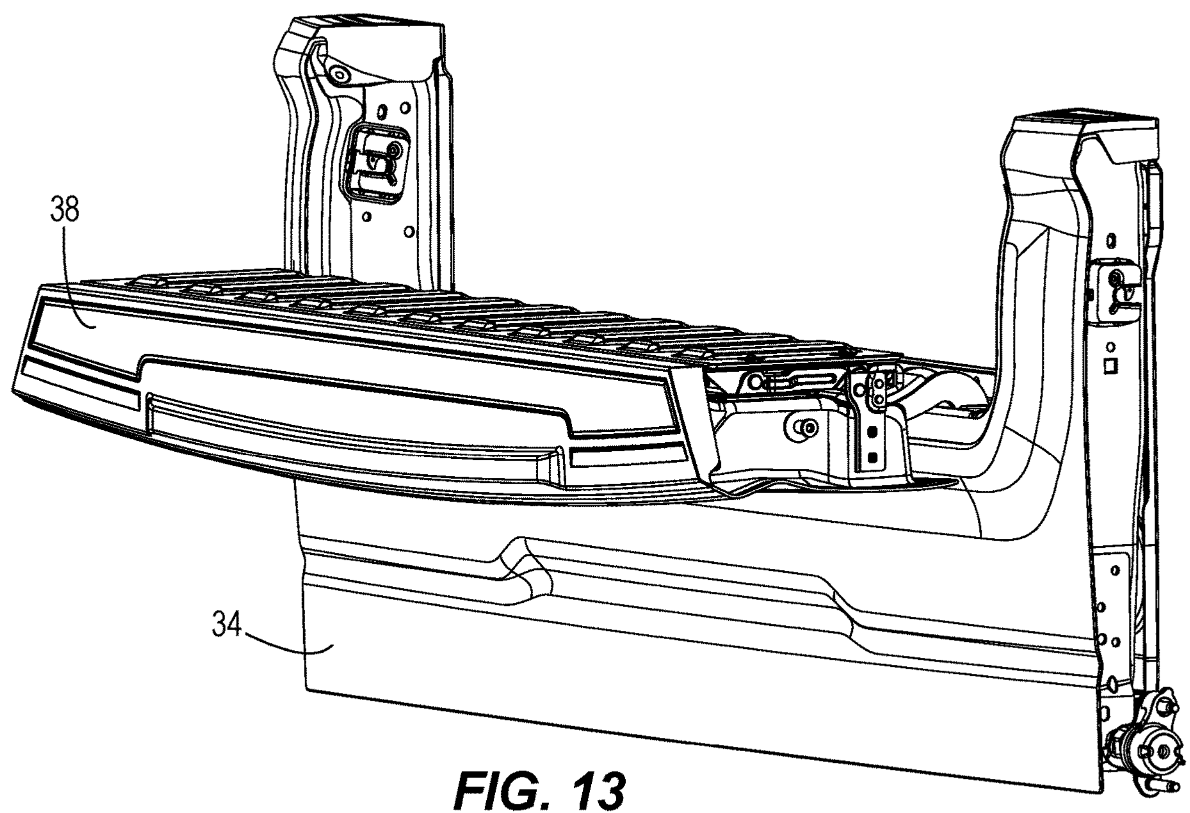
FIG. 13 is a perspective view of the tailgate of FIG. 1 in the second open position of FIG. 3
Figure 14:
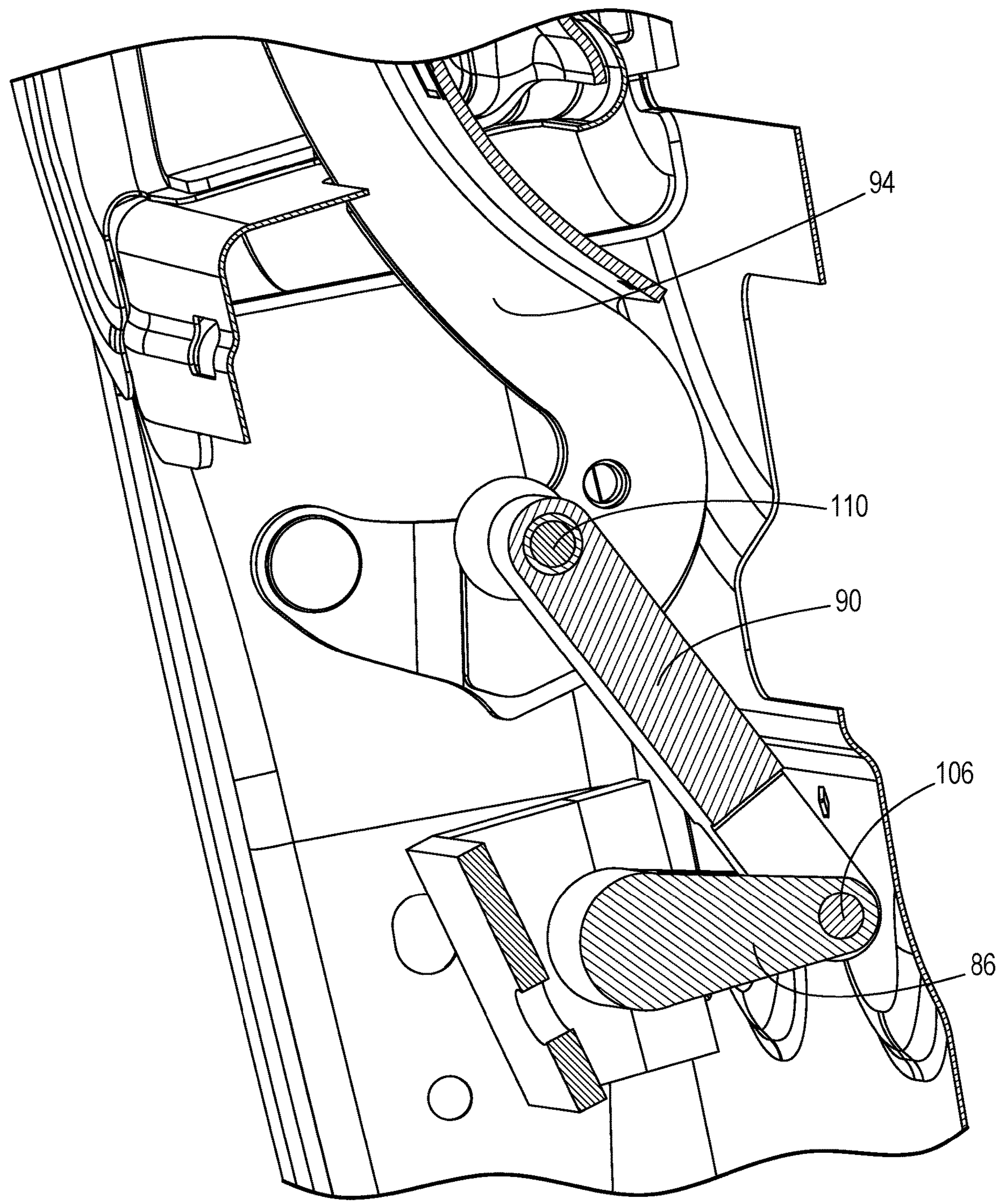
FIG. 14 is a detail view of the minor gate drive linkage, according to one embodiment of the present disclosure, with portions of the minor gate and the minor gate drive unit hidden for clarity.

Details of the linkage assembly 70 for the minor gate drive unit 54 will now be given with respect to FIGS. 6 and 7. A minor drive output member 82, illustrated as a shaft, is rotationally coupled to the minor gate drive unit 54 at the output end 78. The minor drive shaft 82 is parallel to and offset from the major drive shaft 66. Furthermore, the minor drive shaft 82 is shorter in length than the major drive shaft 66. The linkage assembly 70 further includes a drive link 86 and a drag link 90 which, together, couple the minor drive shaft 82 to the minor hinge 74. The drive link 86 has a length (e.g., 50 mm) that is less than a length of the drag link 90 (e.g., 150 mm). The drive link 86 is coupled to the minor drive shaft 82 at one end and to the drag link 90 at the other end. The minor drive shaft 82 and drive link 86 are coupled in a rotationally fixed manner such that rotation of the minor drive shaft 82 results in an equivalent rotation of the drive link 86. In other words, for one degree of rotation of the minor drive shaft 82 the drive link 86 rotates one degree. At the other end of the drive link 86 is a joint 106 at which the drag link 90 is coupled to the drive link 86. The joint 106 as illustrated provided as a pivot that accommodates for relative rotation between the drive link 86 and the drag link 90. The drag link 90 is further coupled to the first strap 94 of the minor hinge 74 for rotation therebetween at an actuating point 110, for example an additional or "output" joint. The joint 106 between the drive link 86 and the drag link 90 and the actuating point 110 can each, respectively, be defined by a pivot pin that extends through a set of aligned apertures. The actuating point 110 is offset from the rotational axis A4 of the minor hinge 74. As will be understood by one of skill in the art, the offset between the minor hinge rotational axis A4 and the actuating point 110 allows the linkage assembly 70 to rotate the first strap 94 about the minor hinge rotational axis A4, thus rotating the minor gate 38 about the rotational axis A4. To open the minor gate 38, the minor gate drive unit 54 rotates the minor drive shaft 82 and subsequently the drive link 86. Rotation of the drive link 86 forces the drag link 90 to move vertically upward, resulting in a vertically upward motion of the actuating point 110. The vertical motion causes the first strap 94 to rotate about its rotational axis A4 and open the minor gate 38. To close the minor gate 38, the minor gate drive unit 54 is rotated in a direction opposite the opening rotating direction, thus resulting in the drive link 86 forcing the drag link 90 to move vertically downward and closing the minor gate 38.

With reference to FIG. 5, the drive system 48 further includes a controller 114 operable to selectively actuate each of the major gate drive unit 50 and minor gate drive unit 54. In particular, the controller 114 can be connected, as illustrated by the broken lines in FIG. 5, to each of the major and minor gate drive units 50, 54 by wires or a wireless communication protocol to convey signals from the controller 114—and optionally back to the controller 114. The controller 114 sends corresponding electrical control signals to the drive units 50, 54 to actuate the respective drive units. Upon receipt of the respective control signals, the drive units 50, 54 rotate the output ends 58, 78 to open or close the major or minor gates 34, 38, respectively. For example, the controller 114 may send corresponding electric control signals in response to an operator's input to a button located on the vehicle 10 or on a fob associated with the vehicle 10. The drive units 50, 54 may be separately controlled by separate buttons or different inputs to the same button (e.g., push or push and hold). The controller 114 is configured to independently actuate each drive unit 50, 54, such that the drive units 50, 54 may be actuated separately or at the same time. The resulting motion of the tailgate, depending on the signal(s) from the controller 114, may be the major gate 34 opening (FIG. 2), only the minor gate 38 opening (FIG. 3), or both major and minor gates 34, 38 opening (FIG. 4). In the case of the major and minor gates 34, 38 both opening, the gates 34, 38 may rotate at the same time or one before the other. The major and minor gate drive units 50, 54 can both be connected to receive power from the vehicle accessory power system, including a 12V battery (not shown).

Although the invention has been described in detail with reference to certain preferred embodiments, variations and modifications exist within the scope and spirit of one or more independent aspects of the invention as described.

Various features of the invention are set forth in the following claims.

What is claimed is:

1. A power operated tailgate for a vehicle, the power operated tailgate comprising:

a major gate including a hinge about which the major gate is configured to be rotatably coupled to the vehicle, the major gate at least partially defining an outer profile of the power operated tailgate;

a minor gate disposed within the outer profile of the power operated tailgate, the minor gate at least partially defining the outer profile and coupled to the major gate, the minor gate rotatable relative to the major gate about a first axis;

a minor hinge coupled to the minor gate and to the major gate, the minor hinge configured to facilitate rotation of the minor gate about the first axis with respect to the major gate;

a minor gate drive unit offset from the first axis and configured to rotationally drive the minor gate about the first axis relative to the major gate; and a linkage assembly coupled to an output member of the minor gate drive unit and to the minor gate, the linkage assembly configured to transmit a drive force for moving the minor gate, wherein the minor hinge includes a first strap disposed within the minor gate, a second strap aligned with the first strap and disposed within the major gate, and a rotating assembly coupling the first strap to the second strap, and wherein the linkage assembly is operably coupled to the first strap.

2. The power operated tailgate of claim 1, wherein the output member of the minor gate drive unit is rotationally fixed to a portion of the linkage assembly to transmit the drive force to the linkage assembly.

3. The power operated tailgate of claim 2, wherein the linkage assembly includes a drive link coupled to the output member for co-rotation therewith, and wherein the linkage assembly includes a drag link rotationally coupled to the drive link and the minor gate, the drag link rotatable relative to the drive link and the minor gate.

4. The power operated tailgate of claim 1, further comprising a major gate drive unit configured to rotationally drive the major gate relative to the vehicle.

5. The power operated tailgate of claim 4, wherein the minor gate drive unit is operable independently of the major gate drive unit.

6. The power operated tailgate of claim 1, wherein the minor gate drive unit is disposed within the major gate.

7. A power operated tailgate for a vehicle, the power operated tailgate comprising:

a major gate including a hinge about which the major gate is configured to be rotatably coupled to the vehicle, the major gate at least partially defining an outer profile of the power operated tailgate;

a minor gate disposed within the outer profile of the power operated tailgate, the minor gate at least partially defining the outer profile and coupled to the major gate, the minor gate rotatable relative to the major gate about a first axis;

a minor hinge coupled to the minor gate and to the major gate, the minor hinge configured to facilitate rotation of the minor gate about the first axis with respect to the major gate;

a minor gate drive unit offset from the first axis and configured to rotationally drive the minor gate about the first axis relative to the major gate;

a linkage assembly coupled to an output member of the minor gate drive unit and to the minor gate, the linkage assembly configured to transmit a drive force for moving the minor gate; and a major gate drive unit configured to rotationally drive the major gate relative to the vehicle, wherein a rotational axis of the major gate drive unit is co-axial with a rotational axis of the major gate.

8. The power operated tailgate of claim 7, wherein the rotational axis of the major gate drive unit is parallel to a rotational axis of the minor gate drive unit.

9. The power operated tailgate of claim 7, wherein the minor gate drive unit is operable independently of the major gate drive unit.

10. The power operated tailgate of claim 7, wherein the minor gate drive unit is disposed within the major gate.

* * * * *